United States Patent [19]
Gaudenzi et al.

[11] Patent Number: 5,818,868
[45] Date of Patent: Oct. 6, 1998

[54] DIRECT-SEQUENCE SPREAD-SPECTRUM RECEIVER INCLUDING CODE ACQUISITION AND DETECTION USING AN AUTOADAPTIVE THRESHOLD

[75] Inventors: Riccardo De Gaudenzi, Leiden; Luca Fanucci, Noordwijk, both of Netherlands; Filippo Giannetti, Buti; Marco Luise, Livorno, both of Italy

[73] Assignee: Agence Spatiale Européenne, Paris, France

[21] Appl. No.: 629,852

[22] Filed: Apr. 9, 1996

[30] Foreign Application Priority Data

Apr. 14, 1995 [FR] France ................... 95 04516

[51] Int. Cl.$^6$ ............................... H04B 1/707
[52] U.S. Cl. ........................... 375/206; 375/207
[58] Field of Search .................. 375/200, 206, 375/207, 343, 367

[56] References Cited

U.S. PATENT DOCUMENTS

| | | | |
|---|---|---|---|
| 4,007,330 | 2/1977 | Winters | 375/330 |
| 4,943,977 | 7/1990 | Uchida et al. | 375/200 |
| 5,263,050 | 11/1993 | Sutterlin et al. | 375/200 |
| 5,440,597 | 8/1995 | Chung et al. | 375/200 |

FOREIGN PATENT DOCUMENTS

| | | |
|---|---|---|
| 0 584 912 | 3/1994 | European Pat. Off. . |
| 39 22 972 | 1/1990 | Germany . |

*Primary Examiner*—Stephen Chin
*Assistant Examiner*—Jeffrey W. Gluck
*Attorney, Agent, or Firm*—Seidel, Gonda, Lavorgna & Monaco, PC

[57] ABSTRACT

The invention relates to the recognition of a spread spectrum data signal transmitted in code division multiple access communication systems. The invention provides a receiver whose code acquisition and detection circuit includes circuitry configured for detecting the signal received by using an audio adaptive detection threshold generated locally from the output signal of the detection circuit itself. The invention is used for example, in terrestrial or satellite radio communication systems.

6 Claims, 8 Drawing Sheets

DIRECT-SEQUENCE SPREAD-SPECTRUM RECEIVER INCLUDING CODE ACQUISITION AND DETECTION USING AN AUTOADAPTIVE THRESHOLD

The present invention relates to direct sequence spread spectrum code division multiple access communications systems and in particular to the receivers of a spread spectrum signal used in these systems. The invention is more particularly concerned with the recognition of the signal and the acquisition of the code used in modulating the transmitted signal.

A fast and reliable technique for signal recognition and code acquisition can turn out to be an essential and crucial element in meeting the fundamental specifications of a communications system, for example a terrestrial or satellite radio communications system.

In the direct sequence code division multiple access (DSCDMA) mobile communications systems, the most effective receivers harness the temporal diversity inherent in a multi-path channel by using several receivers which must track the various echoes arriving at the antenna via the multiple propagation routes. This demands fast and reliable signal detection and signature code synchronization. Moreover, in a code division multiple access network organized via links with dynamic assignment of sources, the base station must provide for fast and reliable acquisition of the signal packets transmitted randomly by dispersed users. Similar requirements pertain to a network which is not organized link-wise, in which the acquisition time of the signal packets demodulator has an immediate influence on the overall data throughput.

In all these situations, the conventional serial search procedures are of low efficiency when evaluated in terms of acquisition time for low signal/noise ratios. On the other hand, these known procedures have hitherto been characterized by a much lower cost/complexity ratio than for parallel search procedures for fast acquisition of direct sequence signals. However, this last consideration is currently partly expunged by the progress made in digital signal processing techniques and in the technologies of very large scale integration (VLSI).

The purpose of the invention is to produce a code acquisition and signal recognition device which can operate in a fast and reliable manner with low signal/noise ratios and which is capable of being implemented within an application specific integrated circuit (ASIC).

A fast digital code acquisition process is already known through FR-A-8913360. This process employs fast parallel signal processing but it calls upon the considerations below. It is based on comparing the amplitude of the output signal from correlators with a fixed threshold and involves five parameters. This results in a relatively complex and bulky device, and its performance is not readily predictable. Moreover, this known process was designed for a TDRSS/DRS spread spectrum system, but it is not optimized for bitwise synchronized spreading used in the current commercial systems. Finally, the losses engendered by the correlation procedure are unacceptable in a satellite communications system.

To achieve the sought-after aim, the invention proposes a signal recognition and code acquisition device based on a noncoherent parallel acquisition procedure using a code adapted filter.

The use of a code adapted filter to replace the conventional correlator has certainly already been proposed by A. Polydoros and C. L. Weber (A. Unified Approach to Serial Search Spread-Spectrum Code Acquisition—Part II: A Matched Filter Receiver, IEEE Transactions on Communications, Vol. COM-32, No. 5, May 1984, pp. 550–560) and L. B. Milstein, J. Gevargiz and P. K. Das (Rapid Acquisition for Direct-Sequence Spread-Spectrum Communications Using Parallel SAW Convolvers, IEEE Transactions on Communications, Vol. COM-33, No. 7, July 1985, pp. 593–600). These devices are, however, unsuitable for low signal/noise ratios.

More recent proposals have been made which also use a code adapted filter, but neither is any of them suitable for operating with a low signal/noise ratio since signal detection is still based on comparing the output level from the filter with a fixed threshold level.

The present invention uses a different approach and proposes a receiver for a spread spectrum signal produced by modulating an electrical signal with a binary code, that comprises a signal demodulator preceded by a sampling circuit for sampling the incoming signal and by a code acquisition and signal detection circuit. This latter circuit comprises means configured so as to recognize the data signal received by comparing a value representative of significant samples, with an autoadaptive threshold based upon the average value of the samples. That autoadaptive threshold is generated by multiplying said average value of the samples by a fixed multiplication factor. Based upon the comparison, the code acquisition and signal detection circuit produces a signal, having a first state indicating the presence of a signal when the aforesaid value is greater than said autoadaptive threshold and a second state indicating the absence of any signal in the contrary case.

In one embodiment, the code acquisition and detection circuit includes a code adapted filter for delivering correlated samples of the incoming signal. Means process the samples in a noncoherent manner and deliver consecutive samples, then means evaluate the average of the components of the samples within a sliding (smoothing) window of programmable width, and finally means evaluate the maximum value of the groups of significant samples selected. A generator of code replicas generates replicas of the code in synchronism with the estimated start of the code of the received useful signal.

The acquisition and detection circuit according to the invention can serve several packet demodulators, this making it possible to optimize the data processing speed. In this case, the circuit includes a means for unspreading the data before dispatching them to the packet demodulators.

The detection circuit computes the autoadaptive detection threshold and features an autoadaptive signal recognition procedure which takes direct account of any possible fluctuations in the amplitude of the signal. By virtue of this autoadaptive threshold, the probability of missed detection is minimized while keeping the false detection probability constant as a function of the signal/noise ratio. Moreover, the acquisition and detection device according to the invention has proven to be remarkably accurate and reliable as regards production of the signal presence flag. It introduces only small losses and allows a high data throughput both in random access transmission mode and in packet transmission mode. Finally, the possibility that it may be constructed with ASIC integrated technology advantageously affords reduced hardware complexity.

The invention is set forth in greater detail in what follows with the aid of the appended drawings.

Figure 1:
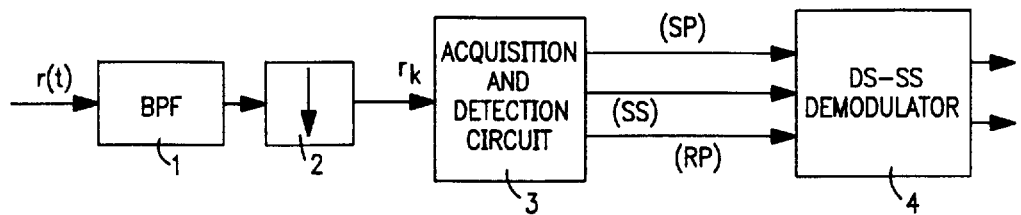
FIG. 1 is a block diagram of a receiver according to the invention.

Represented diagrammatically in FIG. 1 is a signal receiver according to the invention. The band filter 1 receives the baseband input signal r(t) and the output from the filter is sampled asynchronously in the sampler 2 at a predetermined rate. The sampler 2 delivers two or more samples $r_k$ per chip. The filter 1 can be made in analog or digital form by those skilled in the art relying on standard knowledge. The samples $r_k$ are received in an acquisition and detection circuit (SR/CA) 3 according to the invention, the role of which is to detect the signal with the aid of a local signature code and to generate a flag signal SP indicating the presence of a signal in a given and fixed time interval. When a signal SP is detected, the detection circuit 3 produces a code replica RP synchronized with the sample stream SS.

The set of signals produced by the acquisition and detection circuit 3 is transmitted to the demodulator 4, known per se. The latter undertakes the unspreading of the signal by using the signal samples and the code replicas, in a manner known per se.

Given that confirmation of the recognition of the signal normally requires a longer time than the response time of the detection circuit 3, the setup makes it possible to free the detection circuit immediately once the flag signal SP indicates that the message has terminated. The detection circuit 3 is thus directly available for processing a new message.

Figure 2:
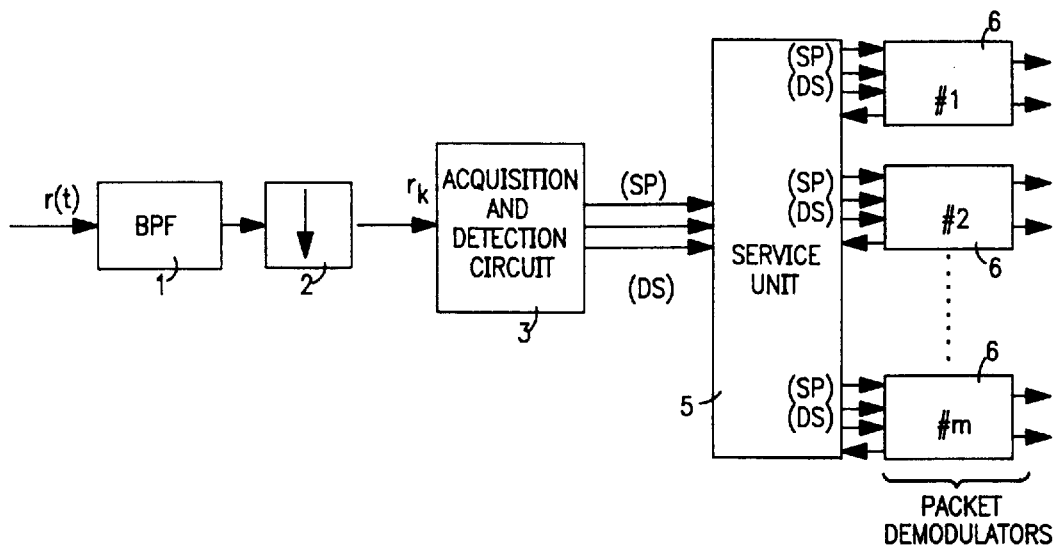
FIG. 2 is a block diagram of a receiver according to the invention, configured for packet demodulation.

FIG. 2 represents a signal receiver variant according to the invention intended for the demodulation of packet data. When the acquisition and detection circuit 3 detects the presence of a signal, it dispatches the presence signal SP and the input signal previously unspread DS with the aid of code replicas to a service unit 5 which serves several packet demodulators 6. The service unit 5 dispatches the unspread signal at the symbol rate to an available packet demodulator. Each demodulator operating at the symbol rate affords frequency, phase and frame synchronization and thus extracts the information bits from the packets. In order to reduce the duration of the packet preamble, the packet demodulator could process the data samples off-line, which would then require a processing time longer than the duration of a packet. In this case also, the acquisition and detection circuit 3 is freed once the signal presence flag signal SP indicates that the message has terminated, this making the circuit directly available to process a new message. The proposed acquisition and signal detection circuit can be used when the code period is an integer multiple of the symbol duration. For the sake of simplicity, in the following description a code period spanning exactly one symbol interval is considered.

Figure 3:
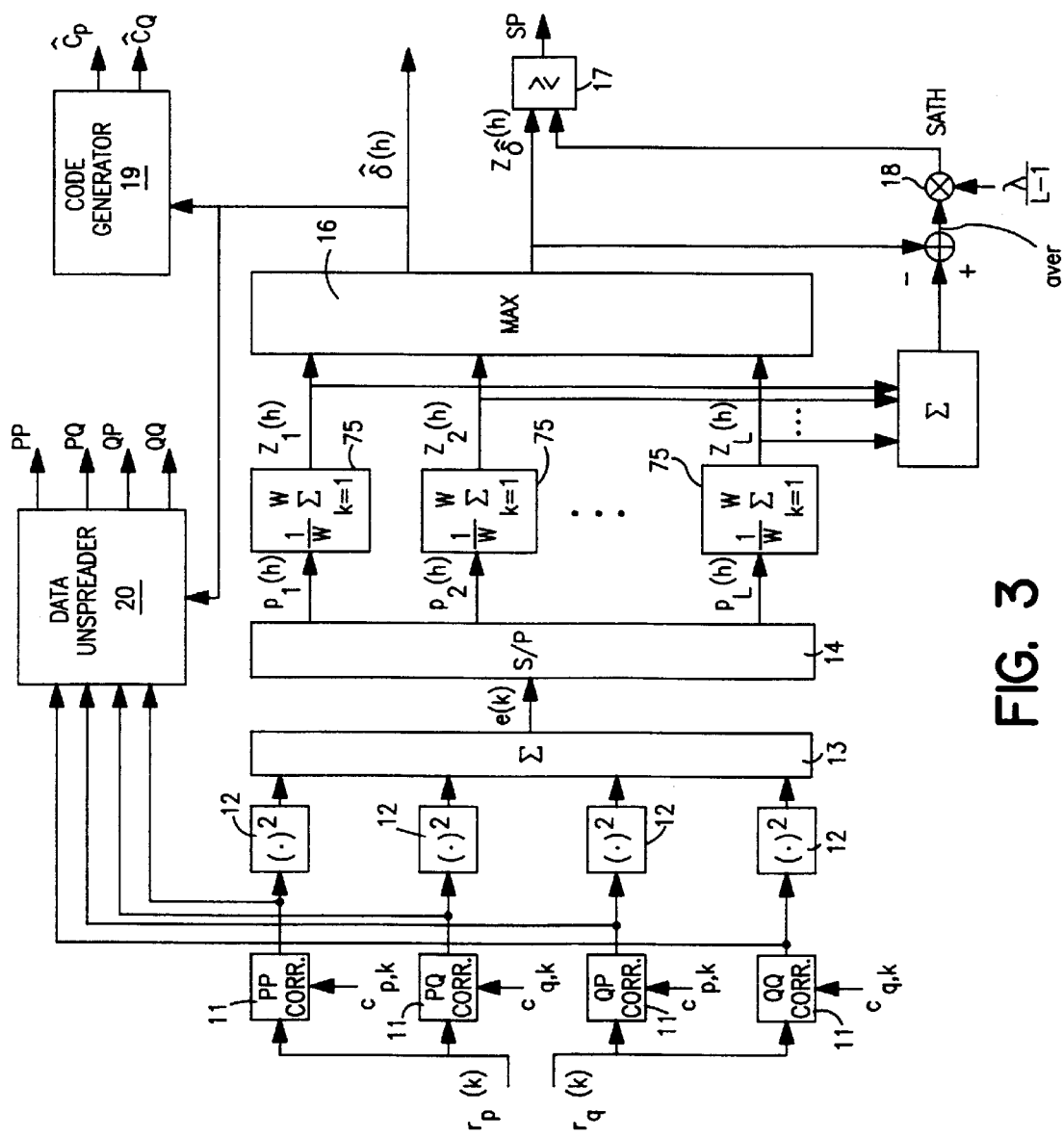
FIG. 3 shows a functional diagram of the acquisition and detection circuit according to the invention.

The acquisition and detection circuit is described in greater detail below with the aid of the functional diagram of FIG. 3. The in-phase component $r_p$ (k) and quadrature component $r_q(k)$ of the samples r(k) are applied to four parallel code adapted filters 11 whose role is to perform the correlation of the incoming signal with the phase spreading and phase quadrature spreading codes. The proposed architecture represents the preferred embodiment, but the same functions could also be performed by using a serial correlator plus additional storage and control circuitry. The samples $S_{p,p}$, $S_{p,q}$, $S_{q,p}$ and $S_{q,q}$ at the outputs of the filters 11 are squared at 12 and added together at 13. The resulting signal e(k) is independent of the modulation of the data and of the phase shift of the carrier (noncoherent processing).

The consecutive samples of e(k) are the correlation of the received signal with progressively shifted versions of the spreading codes $C_P$ and $C_Q$. The estimation problem can be solved by processing the samples e(k) in parallel. The maximum likelihood value of the code phase shift can be found through straightforward comparison of the different values of e(k) calculated for all possible phase shifts of the code within one code period (L). A serial/parallel converter 14 delivers the components $P_1(h) \ldots P_L(h)$ in parallel. This converter also plays the role of a decimator since the outputs are updated at a rate imposed by the length of the code. The index (h) in the identification of the components represents the index of the code period in progress. In order to obtain a significant average of the samples, each component p(h) passes through a sliding window 15 of length W. A set of L signals is thus obtained representing L groups of significant samples Z(h).

The groups of samples Z(h) are next evaluated in an evaluation circuit 16 whose function is to deliver an indication $\hat{\delta}$ (h) of the provisional value of the phase shift of the code in respect of the subsequent demodulation, and to deliver the maximum value of the L groups of significant samples. A detection circuit 17 next compares this maximum value with an autoadaptive threshold SATH generated locally by multiplying at 18 the average of the samples by a multiplication factor Lambda and produces the signal presence flag SP when the aforesaid maximum value exceeds the threshold SATH. The provisional value δ(h) of the phase shift of the code is used in a code generator 19 to synchronize the generation of the replicas $\hat{C}_p$ and $\hat{C}_q$ of the code. As the case may be, as represented in FIG. 3, the acquisition and detection circuit also comprises a data unspreader circuit 20 which selects the correlation samples relevant to the provisional value δ(h) of the code phase from the code matched filter output.

The functional diagram described above presupposes a mode of processing on the basis of one sample per chip. However, the actual ASIC implementation of the invention works on the basis of a programmable number of samples per chip, ranging from two to four samples per chip, this making it possible to minimize the losses from data unspreading through packet processing.

The aim of the acquisition circuit SR/CA is to recognize a signal originating from a particular user among the signals originating from several users. For this purpose, the acquisition circuit must perform on the samples a noncoherent test based on the probability rating of two different hypotheses: signal absence and signal presence. This test consists basically in comparing the estimated level of the signal with a autoadaptive threshold. In order to reduce the computational burden as much as possible in respect of signal recognition and to dispense with any risk of degradation of efficiency as a result of unexpected fast variations in the amplitude of the signal, instead of performing the test on the signal received $r_k$ as is usual, the invention provides for performing this test on the output Z(h) from the acquisition circuit. This manner of proceeding in accordance with the invention makes it possible to reuse the detection circuit itself for this purpose and to produce a simple autoadaptive procedure which takes direct account of any possible fluctuations in the amplitude of the signal.

To do this, the maximum value selected from the samples Z(h) is compared with an autoadaptive threshold SATH generated locally by multiplying the average value AVER by a predetermined multiplication factor Lambda.

In the recognition procedure according to the present invention, the two key parameters which significantly influence the overall performance of the circuit are the length W of the equalization window and the multiplication factor Lambda which scales the autoadaptive detection threshold.

By virtue of an autoadaptive detection threshold, the probability of false detection is independent of the actual signal/noise ratio. The probability of missed detection is a decreasing monotonic function of the signal/noise ratio, its value being less than that which results from the optimal Neyman-Pearson criterion. This particular feature is very useful in the packet processing mode for which the probabilities of false detection and of missed detection have to be lower than a specified value. A missed detection in fact results in a loss of a data packet. The parameters Lambda and W of the circuit are selected so as to satisfy the requirements in respect of the probabilities of missed detection (PMD), of false acquisition (PFA) and of wrong phase acquisition (PWA) for the worst signal/noise ratio and the worst signal detection latency. For a better signal/noise ratio, the probabilities PMD and PWA will be lower than the specified maximum value whereas the probability PFA and the latency will remain unchanged.

In addition to its performance evaluated in terms of speed of acquisition and of signal recognition and in terms of reliability of detection, the circuit according to the invention has the advantage that it may be constructed in ASIC technology.

Figure 4:
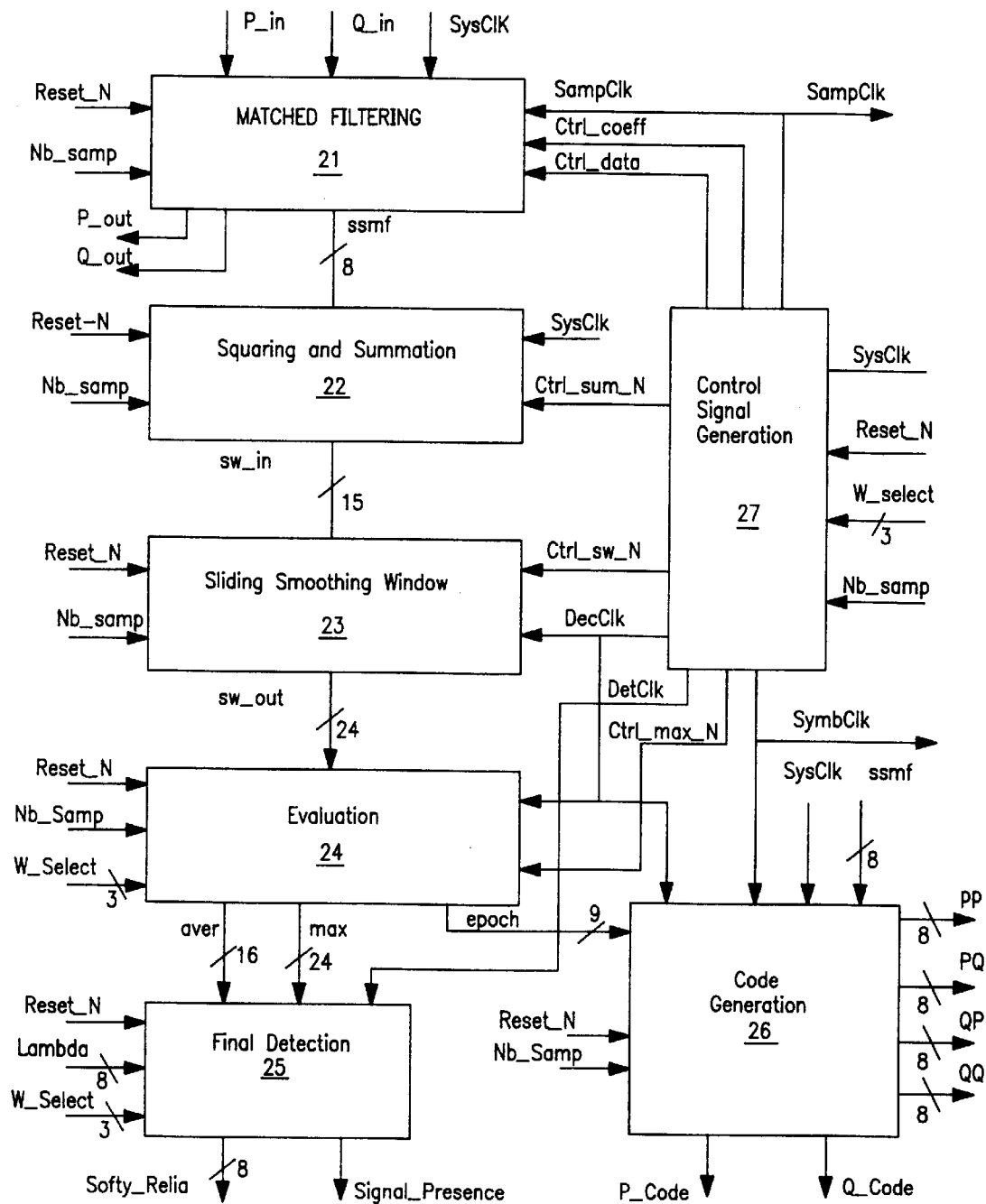
FIG. 4 illustrates the architecture of an integrated embodiment in respect of the acquisition and detection circuit according to the invention.
Figure 5:
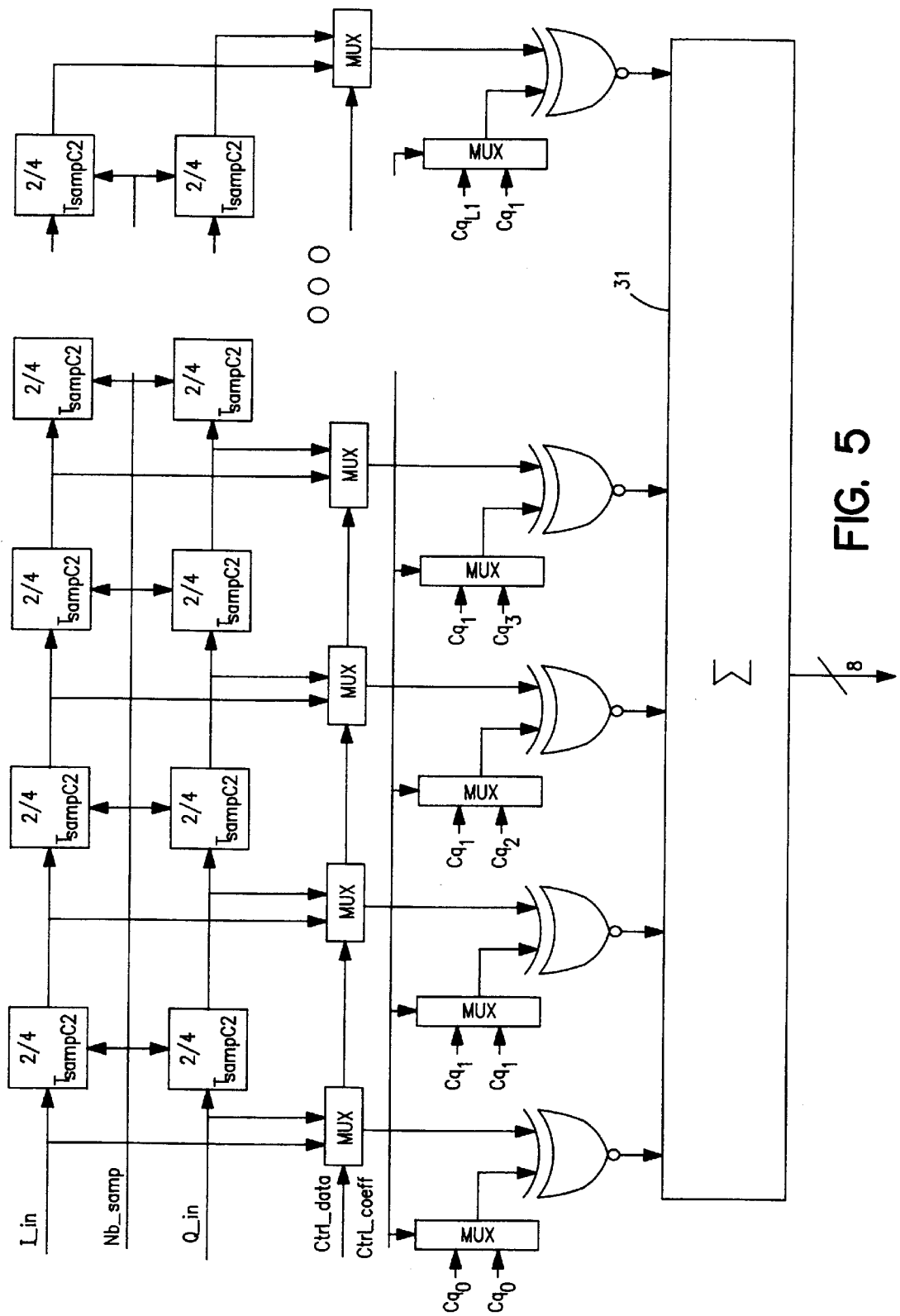
FIGS. 5 to 11 are block diagrams of the subassemblies making up the embodiment illustrated in FIG. 4.

FIG. 4 represents a block diagram of the architecture of an embodiment in ASIC technology. The input signals are the highest order bit Pin of the n-phase component of the output signal from the input filter and the highest order bit Qin of the quadrature component of the output signal from said filter. This embodiment, applicable to any of the family of signature codes, was designed in order to demodulate a QPSK DS/SS CDMA type signal.

For clarity of exposition, the description which follows is given while considering the processing of one sample per chip, it being understood, however, that the circuit has been embodied while providing for its use for the processing of a programmable number of samples per chip (a value of two or four samples per chip) by means of minor modifications. FIG. 4 is complemented by FIGS. 5 to 11 which represent the subassemblies which make up the functional blocks shown in FIG. 4. Indicated in the aforesaid complementary figures are the lengths selected in respect of the internal binary words. These lengths were selected as a result of an analysis aimed at affording an acceptable compromise between the complexity of the circuit and the performance of the receiver.

Block 21 carries out a filtering matched to the spreading code of the components P and Q of the input signal with the aid of two signature sequences. These signature codes are designated by $C_P$ and $C_Q$ in FIG. 5 which represents a simplified diagram of the filtering block. An exterior signal $N_{b-samp}$ fixes the number of samples per chip. Through judicious supervision of the incoming data stream and of the signature sequences, filtering is carried out by means of a single data correlator instead of four, this considerably reducing the complexity of the hardware since the number of gates to construct a complex correlator is of the order of 10,000 (which is approximately a quarter of the total number of gates of the application specific integrated circuit). This circuit can readily be constructed in complementary MOS technology (CMOS). The correlated samples are ranked at the output of the adder 31 at the system clock rate FSysClk and are represented on 8 bits (signal ssmf).

Figure 6:
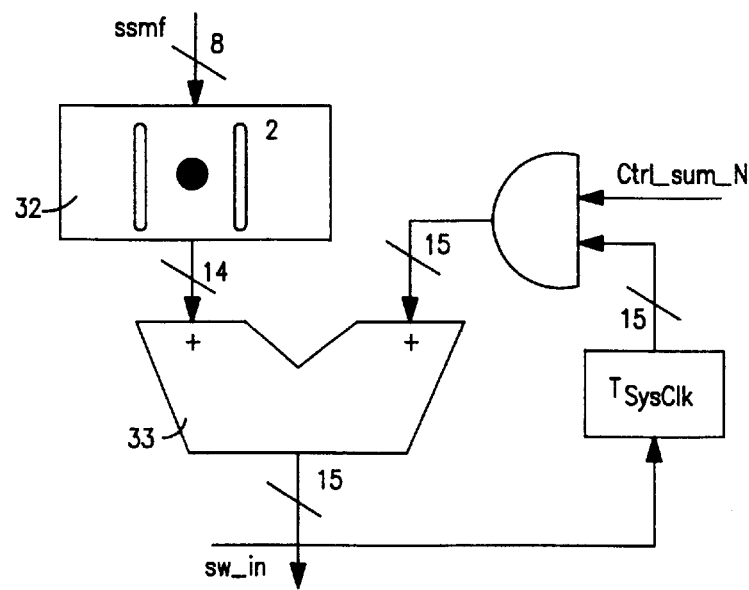
Figure 7:
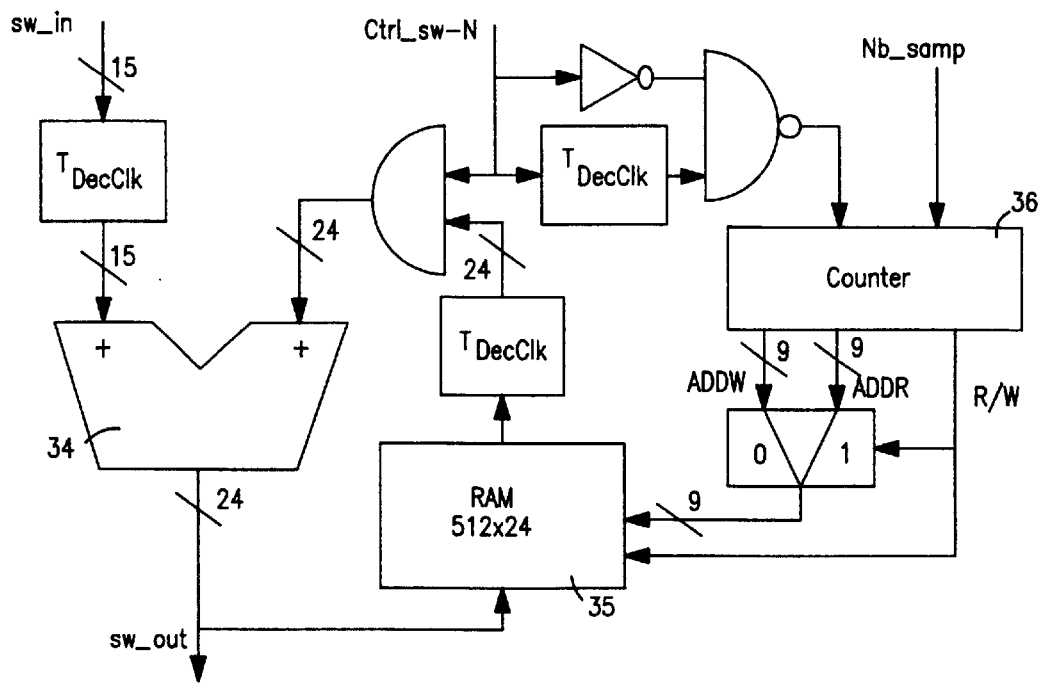

The correlated samples SSMF are fed into the squaring and summation block 22, a constructional diagram of which is represented in FIG. 6. As a result of the nested organization of the data, the latter are serial in time so that it is possible to embody the function with the aid of a squaring device 32 and an appropriately controlled accumulator 33. The output from block 22, represented over 15 bits, is dispatched to the sliding smoothing window (block 23) at the sampling rate $F_{sampClk}=¼ F_{SysClk}$.

The role of block 23 is to perform the above-described smoothing of the processed samples. Instead of performing a serial/parallel conversion followed by an equalization function as shown diagrammatically in FIG. 3, the embodiment represented in FIG. 7 carries out the smoothing with the aid of an accumulator 34 and of a RAM memory element 35, this making the serial/parallel conversion superfluous. The RAM memory is accessed at a rate twice the data rate so as to allow the execution of a read operation and of a write operation during a sample interval TSamp=1/FSampClk. Initialization of the accumulator and control of the read/write operations are supervised by suitable control signals. The groups of L samples SW-out are delivered at the rate $F_{SampClk}/(L*W)$ whereas in each group the data rate is $F_{SampClk}$.

Figure 8:
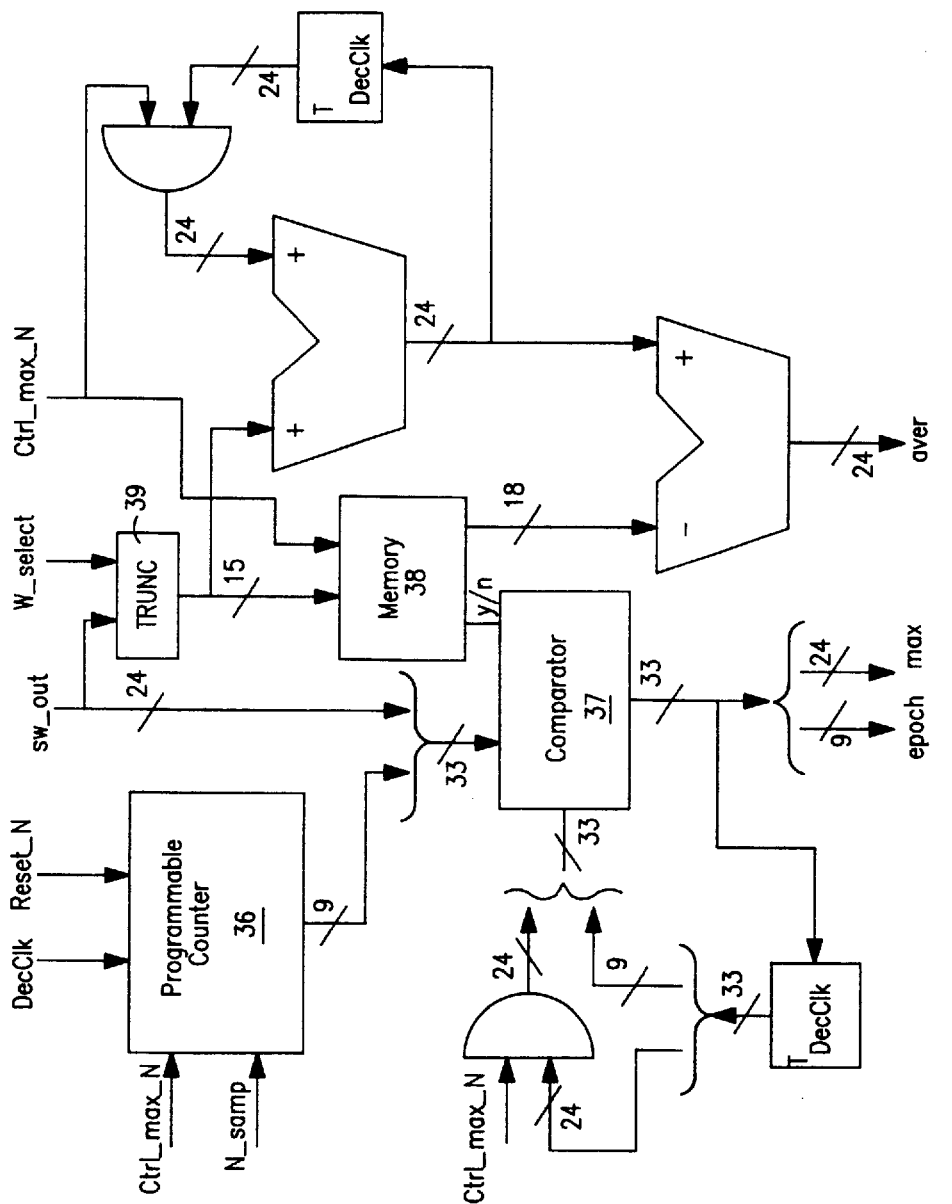

The sample groups SW-out are received in the evaluation block 24, a diagram of whose architecture is represented in FIG. 8. The incoming data are first tagged by the code phase information and delivered by a suitably initialized programmable counter 36. Evaluation of the maximum is next performed with the aid of a single comparator 37 and of a memory element 38 in recurrent mode. Evaluation of the average aver is done by simply accumulating the L-1 remaining samples. In order to reduce the complexity of the circuit, the evaluation of the average is performed on the output from the smoothing block 23, truncated to 15 bits. The truncation is carried out at 39 whilst taking account of the dynamic aperture of the sliding window which depends on the integration period W. In principle, to obtain the level of the average, the output from the accumulator (FIG. 3) ought to be multiplied by 1/(L-1). However, to reduce the complexity of the circuit, this normalization factor is taken into account in the detection block with adjustment by the multiplication factor Lambda. The outputs from block 24 are the estimated phase epoch of the code, the maximum value max of the L groups of selected samples and the average value aver of the L groups of selected samples. These outputs are furnished at the rate $F_{SampClk}/(L*W)$.

Figure 9:
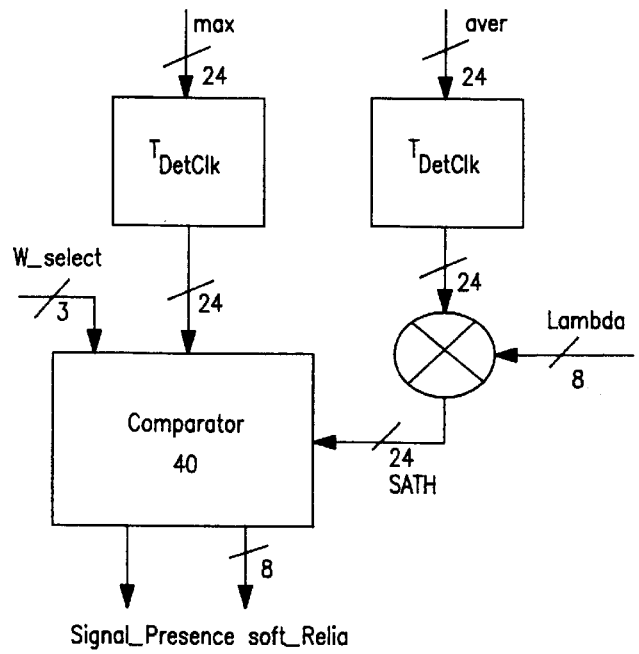

Final detection of the signal is performed in block 25, one mode of execution of which is represented in FIG. 9. The maximum value max is compared at 40 with an autoadaptive threshold SATH generated by multiplying at the average signal AVER by a multiplication factor Lambda. A flag SP indicating the presence of a signal is produced by the comparator 40 when the value max exceeds the autoadaptive threshold SATH. An additional output on 8 bits (Soft Relia) delivers an indication regarding the reliability of the detection performed.

Figure 10:
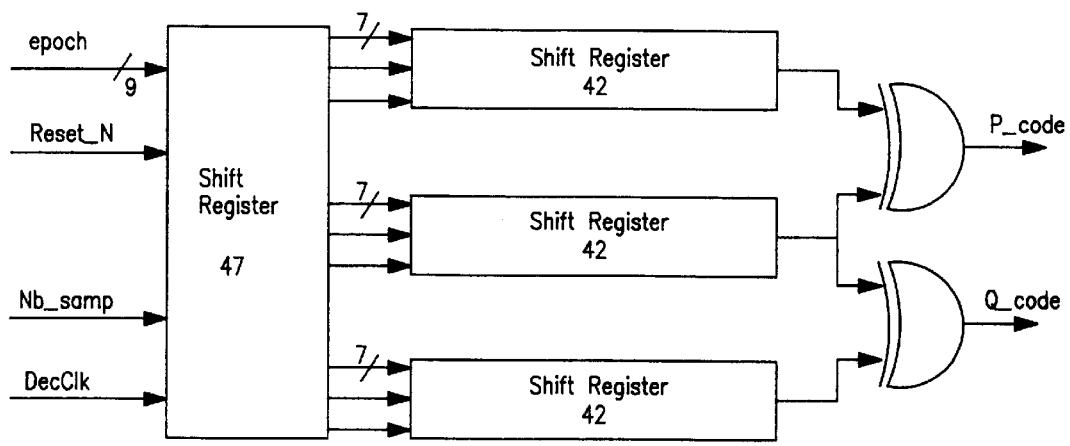
Figure 11:
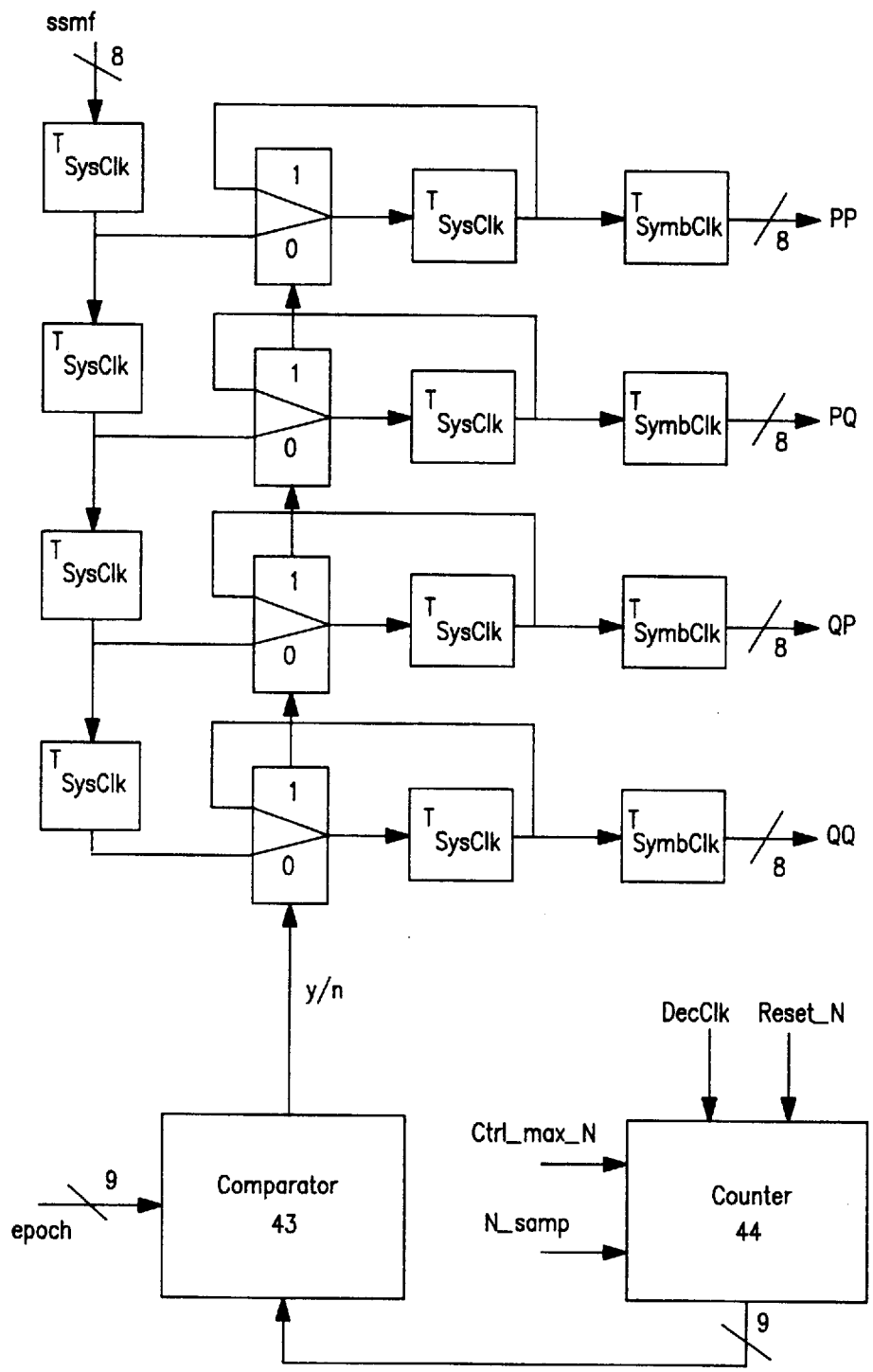

Block 26 generates the codes P and Q used as signature sequences and produces the unspread components of the input signal. FIG. 10 represents a codes generator circuit. This circuit essentially comprises shift registers 41 and 42 and generates the codes P and Q in synchronism with the estimated start of the phase of the code (signal epoch). FIG. 11 is a block diagram of a data unspreader circuit in which 43 designates a comparator and 44 a programmable counter. It is configured so as to select the samples appearing at the output of the filter 21 in synchronism with the signal epoch, that is to say in synchronism with the signature codes, and to afford the serial/parallel conversion of the unspread data. The components PP, PQ, QP and QQ are furnished at the symbol rate under the supervision of the counter 44.

Block 27 generates all the control signals which clock the operation of the entire circuit. It essentially comprises a programmable counter which can be programmed for various numbers of samples per chip and various lengths W of smoothing window. This circuit is therefore adaptable to diverse configurations of the acquisition and detection circuit.

The embodiment described in the foregoing is an example which serves to illustrate the advantageous possibilities allowed by the invention, but it is of course understood that the latter is in no way limited to this particular embodiment. Other modes of embodiment are within the normal competence of those skilled in the art.

What is claimed is:

1. A receiver for a spread spectrum signal produced by modulating an electrical signal with a binary code, the receiver comprising:

a sampling circuit for sampling a limited-band signal;

a code acquisition and signal detection circuit connected to the sampling circuit; and a signal demodulator connected to the code acquisition and signal detection circuit, the code acquisition and signal detection circuit comprising:

means configured so as to recognize the presence of received signals by comparing a maximum value representative of significant samples, $Z_1(h)$, . . . $Z_L(h)$ with an autoadaptive threshold, the autoadaptive threshold being generated by multiplying an average value of the significant samples and a fixed multiplication factor and producing a signal having a first state when the maximum value is greater than the autoadaptive threshold, indicating the presence of a signal, and a second state when the maximum value is less than the autoadaptive threshold, indicating the absence of a signal.

2. A receiver as claimed in claim 1, further comprising a code adapted filter for delivering correlated samples of the electrical signal, means for processing the samples in a noncoherent manner and for delivering consecutive samples, means for converting the consecutive samples to groups of parallel samples, means for generating a set of averages of the groups of parallel samples within a sliding smoothing window of a predetermined width, and means for determining the maximum value of the averages set.

3. The receiver as claimed in claim 2, further comprising a means (14) for delivering the aforesaid components ($p_i(h)$) in parallel.

4. The receiver as claimed in claim 3, further comprising a means for unspreading the signal received with the aid of code replicas.

5. The receiver as claimed in claim 4, further comprising a generator of code replicas.

6. A code acquisition and signal detection circuit as defined in any one of the preceding claims.

* * * * *